United States Patent Office 3,068,263
Patented Dec. 11, 1962

3,068,263
PROCESSES FOR PREPARING LIQUID STABLE ALUMINUM ALKOXIDE MATERIALS
William E. Smith, Weston, Mich., assignor to Stauffer Chemical Company, Adrian, Mich.
No Drawing. Filed Dec. 23, 1959, Ser. No. 861,436
3 Claims. (Cl. 260—448)

This invention relates to processes for preparing liquid stable aluminum alkoxide materials which include lower aliphatic aluminum alcoholates normally unstable in storage.

It is characteristic of lower aluminum alkoxide materials to solidify under storage conditions, i.e., the material deteriorates upon exposure to air and moisture even when the storage vessel is sealed, the reaction product being aluminum oxide and alcohol. It is quite desirable, however, to maintain the aluminum alkoxides of lower alkyl alcohols in their liquid form under extended periods of time so they can thereby be stored, shipped and subsequently used but without solvents which add to the bulk and weight. The liquid aluminum alcoholates have a wide variety of uses; for example, the lower aluminum alkoxide materials make excellent paint additives but if they are unstable in storage or when incorporated into the paint, then their value is obviously diminished.

Another value of the liquid aluminum alkoxide is its use as a starting material for synthesis reactions wherein various organo-metallic compounds are ultimately producible.

It is the foremost object of the present invention to provide a liquid stable aluminum alkoxide having less than four carbon atoms in the alkoxy radical, such alkoxide materials being normally unstable and tending to deteriorate with aging.

Another purpose of the present invention is to form liquid stable aluminum alkoxide materials by means of a simple process which is readily controllable and necessitates no special equipment or costly devices.

The processes of the present invention are of particular advantage in that liquid stable aluminum alkoxide materials may be produced which can be modified in their chemical properties so that the resulting material is adapted to an intended usage with these modifications in mind.

Another important feature of the present invention is that the degree of stability of the aluminum alkoxide can be controlled to meet specific consumer requirements and the specific properties needed in the material. Thus, a wide assortment of choice is made possible both in the degree of liquid stability and in end properties to make it most suitable to its intended application.

Other objects and other features of the invention will become apparent from the following description.

It is well known that lower aluminum alkoxide materials readily decompose in the presence of water to form alumina and alcohol even where the containers are sealed. The tendency toward deterioration is shared by all of the aluminum alcoholates of less than four carbon atoms, viz., aluminum n. propyl trialkoxide, aluminum tri-isopropoxide, aluminum triethoxide, etc. It has been discovered, however, that when sufficient of the lower alkoxy groups are replaced by certain higher alkoxy radicals having four or more carbon atoms, the resultant material will not so deteriorate providing the replacement is in sufficient amount.

I am not able to state any precise reason as to why replacement of the lower alkoxy radical by certain higher alkoxy radicals will effect the desired liquid stability. Some investigations have been made regarding the nature of association of different aluminum alkoxide materials indicating that certain dimer formations may be formed between different aluminum alkoxides. "Aluminum Alkoxides," Journal India Chem Soc. vol. 30, No. 9, 1953, R. C. Mehrotra. Such prior investigation work, however, while helpful to an understanding of certain association between different alkoxides is of no apparent assistance in explanation of the phenomena which I have discovered wherein only partial replacement is made of the lower alkoxy group by a selected higher alkoxy group to provide an aluminum alcoholate having a combination of both alkoxy radicals bonded with the same aluminum atom.

In accordance with the discoveries of this invention, I have found that by adding certain alcohols to liquid aluminum triisopropoxide, for example, the alcohol, having a carbon content higher than the isopropoxy radical, will replace the latter thereby forming isopropyl alcohol. The resulting conjugation of both higher and lower alkoxy radicals in the same aluminum alkoxide, has surprisingly improved stability; and, where a sufficient amount of the aluminum isopropoxide is affected, the resultant material is liquid stable to a degree approximately proportional to the extent of such replacement. Not all alcohols of four carbons or greater, however, are suitable. No theoretical teaching is available to guide in selection of the higher alkoxy radical replacement; and, there appears to be no apparent reason why all are not equally suitable in light of present knowledge even assuming the formation of dimeric forms as postulated by Mehrotra (Supra). For example, whereas s. butanol is effective in replacing isopropoxy radicals to provide liquid stability; n. butanol is not operative. The alcohol which is used in supplying the replacement alkoxy radical appears therefore to be of paramount importance.

Those alcohols which are discovered to be workable are s. butyl alcohol, n. amyl alcohols, s. amyl alcohol, mixed primary amyl alcohols, i.e., those having both straight and branched chain disposition of the carbon atoms, and t. amyl alcohol. The alcohol addition in each of these examples will displace whatever alkoxy radical is joined with aluminum of less than four carbon content and there is formed concurrently the lower boiling point alcohol from the displaced alkoxy radical which is then distilled off. For convenience in calculation, I have expressed my results in terms of relative proportions of aluminum alkoxides as though they were mixtures of two pure combinations of the alkoxides taken separately, but this is functional in expressing the true chemical nature of the material produced which is a mixed aluminum alkoxide wherein aluminum atoms have co-ordinated alkoxy groups of the higher and lower types.

The general reaction may be expressed as follows, wherein the symbols "M" and "N" represent respectively the molar quantity of normally unstable aluminum alkoxide and that of the higher carbon content alcohol:

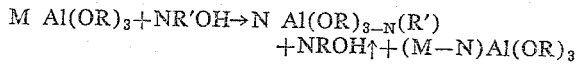

The end product is controlled by determining the amount of N and the selection of whichever R' appears most suitable in the reaction product. In all instances, it will be seen that R'OH is a lower boiling point alcohol than is ROH, for the reason that R consists of less than four carbon atom chain and R' is in all instances a four or greater carbon atom chain. It is of further importance to maintain the quantity of R'OH sufficiently high so that enough of the lower alcoholate material is affected to achieve the necessary end product liquid stability. Equally important, however, is that the R'OH is not so great as to effect a complete interchange by replacing all of the R groups in the original Al(OR)$_3$ to form a new alkoxide Al(OR')₃. This would, of course, defeat the purpose of securing a liquid stable (Al(OR)₃ alcoholate having less than four carbon atoms. The proper balance is reached where sufficient R'OH is added to form an amount of replacement alcoholate equivalent to that of not less than about 10% of pure Al(OR')₃ to 90% of pure Al(OR')₃.

Specific procedures and examples illustrative of the invention are as follows:

*Example 1*

To 600 grams of aluminum triisopropoxide (solid) add 366 grams n. amyl alcohol (liquid). The resulting compound is equivalent to a theoretical mixture of 46.5% aluminum triisopropoxide and 53.5% aluminum n. amyl trialkoxide. The foregoing materials were charged to a conventional heating vessel with a distilling tower and the vessel then heated with the reaction proceeding as follows:

| Time | Pot temperature, °C. | Head temperature |
|---|---|---|
| 12 minutes | 87 | 78° C. |
| 30 minutes | | 79° C. |
| 1 hour 20 minutes | 112 | 80° C. |
| 1 hour 37 minutes | 160 | 79° C., stop. |

At the end of this period, all of the n. amyl alcohol had been reacted and the pot temperature reached a temperature substantially in excess of the boiling point of isopropanol. Care must be taken in the example as well as the succeeding examples not to exceed the boiling point of the alcohol additive during the heating period lest it be removed before its reaction with the alkoxide. The residue in the pot was 712.1 grams. The resultant material maintained its liquidity for well over a year but it became solid upon attempts made at distillation of the residue.

*Example 2*

To 982.9 grams of aluminum isopropoxide add 900 grams of n. amyl alcohol and heat for two hours and 15 minutes. The pot temperature during this time increased from about 103° C. to about 165° C. and the head temperature dropped from 80° C. to about 39° C. The resulting material was a compound equivalent to a theoretical mixture of 90% aluminum triisopropoxide and 10% aluminum n. amyl trialkoxide and it remained liquid for approximately 20 to 22 days.

*Example 3*

To 930 grams of aluminum triisopropoxide add 356 grams of s. butanol to provide a compound which is equivalent to a theoretical mixture of 60% aluminum triisopropoxide and 40% aluminum trisecondarybutoxide. The mixture was heated for approximately two hours and six minutes during which the pot temperature increased from 95° C. to 167° C. and the head temperature remained constant at 79° C. The residue of 956.8 grams has retained its fluidity for a period in excess of one year.

*Example 4*

To 600 grams of aluminum triisopropoxide add 366 grams of mixed n. amyl alcohols (Sharples) and heat for two hours and twenty-seven minutes or until all of the isopropanol is removed. Distillation was performed under atmospheric conditions as were all of the other examples. The pot temperature increased from 23° C. to about 166° C. and the head temperature from 76° C. to 81.5° C. The residue has maintained its liquid condition for about 9 months.

*Example 5*

To 684 grams aluminum triisopropoxide add 368 grams of n. amyl alcohol to provide a compound which is the equivalent of a theoretical mixture of 50% aluminum tri- isopropoxide and 50% aluminum n. amyl trialkoxide. The pot temperature increased to about 212° C. signalling the termination of the reaction at which all of the isopropanol is separated. The residue has retained its liquid condition for approximately ten months.

*Example 6*

To 745 grams of aluminum triisopropoxide add 289 grams s. butyl alcohol and heat the mixture until all isopropanol is distilled out, thereby providing a compound which is equivalent to a theoretical mixture of 50% aluminum triisoproporide and 50% aluminum trisecondarybutoxide. The resulting material has retained liquid for over ten months.

*Example 7*

To 684 grams of aluminum triisopropoxide add 368 grams of t. amyl alcohol thereby producing 890 grams of product equivalent to a theoretical mixture of 50% aluminum triisopropoxide and 50% aluminum t. amyl trialkoxide. At pot temperature of 200° C., the reaction was completed. The material has retained its liquidity for approximately nine and one-half months.

*Example 8*

To 707 grams of aluminum triisopropoxide add 294 grams of t. amyl alcohol to produce 799 grams of product equivalent to a theoretical mixture of 60% aluminum triisopropoxide and 40% t. amyl trialkoxide.

*Example 9*

To 577 grams of aluminum triisopropoxide add 306 grams of mixed primary amyl alcohols to provide 677 grams of product and completely distill off isopropanol. The resulting compound is equivalent to a theoretical mixture of 50% aluminum triisopropoxide and 50% tri n. amyl alkoxide. The resulting material gradually jelled to a colloidal condition over a five month period.

*Example 10*

To 187 grams of aluminum isopropoxide add 92 grams of t. butanol and the mixture is then heated and brought to reflux until all isopropanol is distilled off leaving liquid aluminum alkoxide which has remained liquid for over approximately two months providing a yield of 194 grams of product.

The upper limit of higher alcohol addition is imprecise as an addition to the lower alkoxide. As previously mentioned, amounts of alcohol, less than that necessary to provide an equivalent of at least 10% of aluminum substituted alkoxide, fail to effect sufficient liquidity to the resulting compound. And amounts of alcohol greater than that which will form a compound equivalent to 60% aluminum substituted alkoxide has no apparent factor of improvement since the material is already of indefinite liquidity.

There is a difference, however, in the resulting materials depending upon the choice of alcohol. If the higher alcohols, such as amyl alcohols, are used the resulting material is slower to react with other organic materials as for example in promoting cross linkage polymerizations wherein the aluminum alkoxide functions as a promoting agent. This can be a desirable factor and hence a particular liquid aluminum alkoxide can be chosen on the basis of what reaction is intended.

Although the present invention is explained with only certain selected embodiments, it will be appreciated that these are illustrative of the invention and are in no way restrictive thereof. It is reasonably expected that those skilled in the art may make alterations and revisions of the invention while incorporating the herein disclosed principles and it is intended that such revisions and variations will be within the scope of the following claims as equivalents thereof.

What is claimed is:

1. A process for producing liquid stable aluminum alkoxide having less than four carbon atom alkoxy radicals, comprising the steps of blending with a liquid preparation of said aluminum alkoxide an alcohol addition selected from the group consisting of any of the isomeric primary alcohols, t. amyl alcohol, and s. butyl alcohol to effect an equivalent molar replacement of the lower alkoxy radical by said added alcohol which forms a substitutionary alkoxy radical bonded with the aluminum atom of said aluminum alkoxide to produce thereby an alcohol having less than four carbon atoms and which is formed from the replaced alkoxy radical, said added alcohol being in an amount which leaves a remainder of replaceable alkoxy radicals of less than four carbon atoms bonded with the aluminum atoms so that the composition contains an amount of lower carbon atom alkoxy material equivalent to from about 95% to about 40% aluminum alkoxide having less than four carbon atoms, and heating the blended mixture of aluminum alkoxide and said added alcohol to remove the replaced alkoxy radical of less than four carbon atoms as a lower boiling alcohol to produce a mixture which is of liquid state and characterized by its liquid-stable condition over extended storage periods.

2. A process for producing liquid stable aluminum alkoxide material having less than four carbon atoms in the alkoxy radical thereof, comprising the steps of blending with a liquid preparation of said aluminum alkoxide an alcohol addition selected from the group consisting of any of the isomeric primary alcohols. t. amyl alcohol, and s. butyl alcohol to effect an equivalent molar replacement of the lower alkoxy radical and a substituted bonding of the added alcohol as a substitutionary alkoxy radical bonded with the aluminum atom of said aluminum alkoxide and to produce thereby an alcohol having less than four carbon atoms and which is formed from the replaced less than four carbon alkoxy radical, said added alcohol being in amount sufficient to leave a remainder of further replaceable alkoxy radicals of less than four carbon atoms bonded with the aluminum atoms so that the composition contains an amount of lower carbon atom alkoxy radicals equivalent to from about 80% to about 40% pure aluminum alkoxide having less than four carbon atoms, and heating the blended mixture of aluminum alkoxide and said added alcohol to remove the replaced alkoxy radical of less than four carbon atoms as a lower boiling alcohol to produce a mixture which is of liquid state in all instances of preparation and characterized by its liquid-stable condition over extended storage periods.

3. A process in accordance with claim 2 wherein said mixture of aluminum alkoxide and alcohol addition are heated and distilled until the resultant temperature of the mixture is substantially in excess of the boiling point of the alcohol replacement having less than four carbon atoms.

References Cited in the file of this patent

UNITED STATES PATENTS 2,687,423    Mesirow _____ Aug. 24, 1954

OTHER REFERENCES

Mehnotra: Jour. Ind. Chem. Soc., vol. 31, No. 2 (1954), pages 85–90.